April 7, 1964   J. P. REBER ETAL   3,127,669
ARTICLE FEEDING APPARATUS
Filed March 14, 1961   4 Sheets-Sheet 1

INVENTORS
J. P. REBER
W. A. SCHLEMM
G. G. SEAMAN
By
Nugent
ATTORNEY

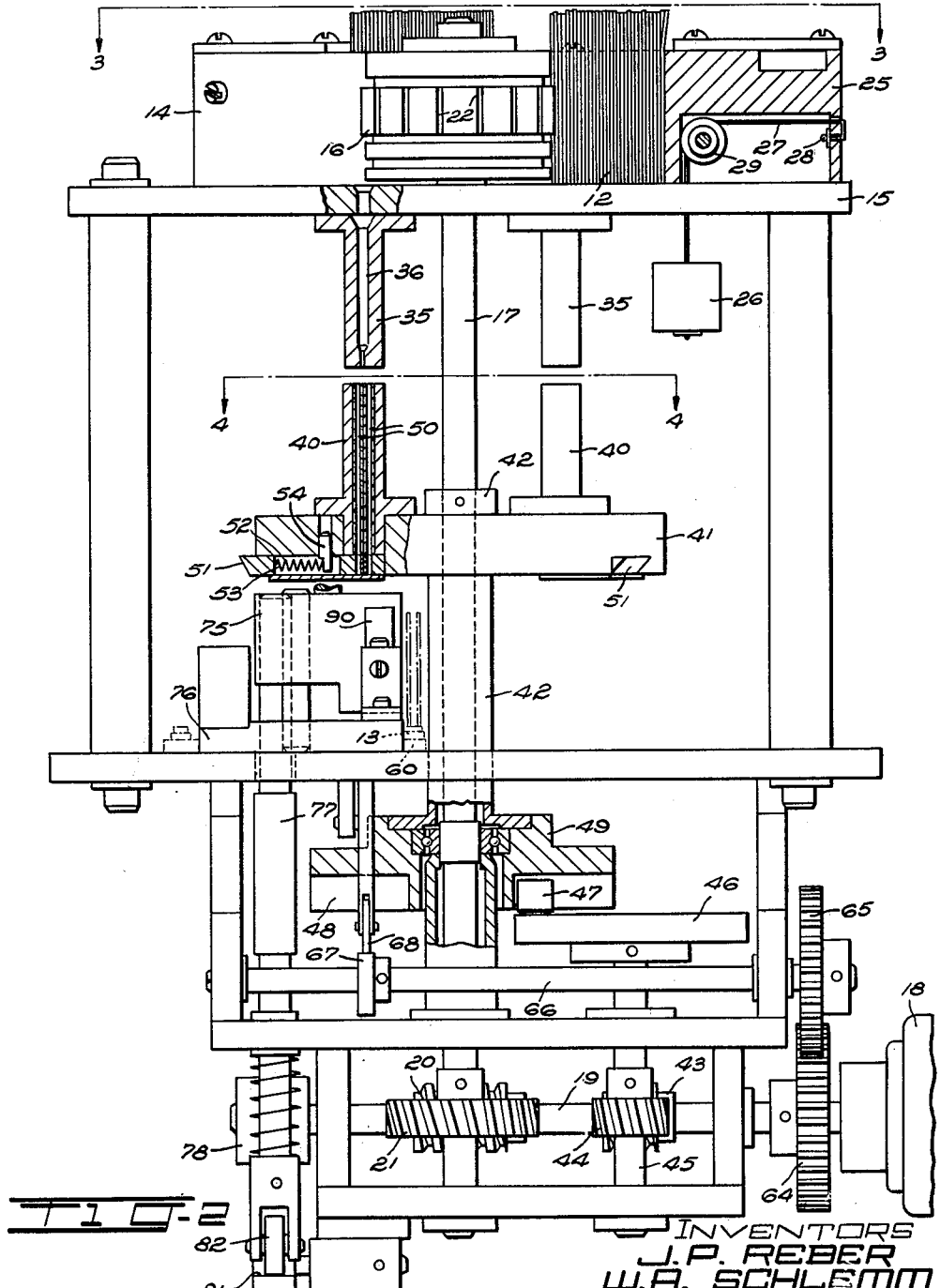

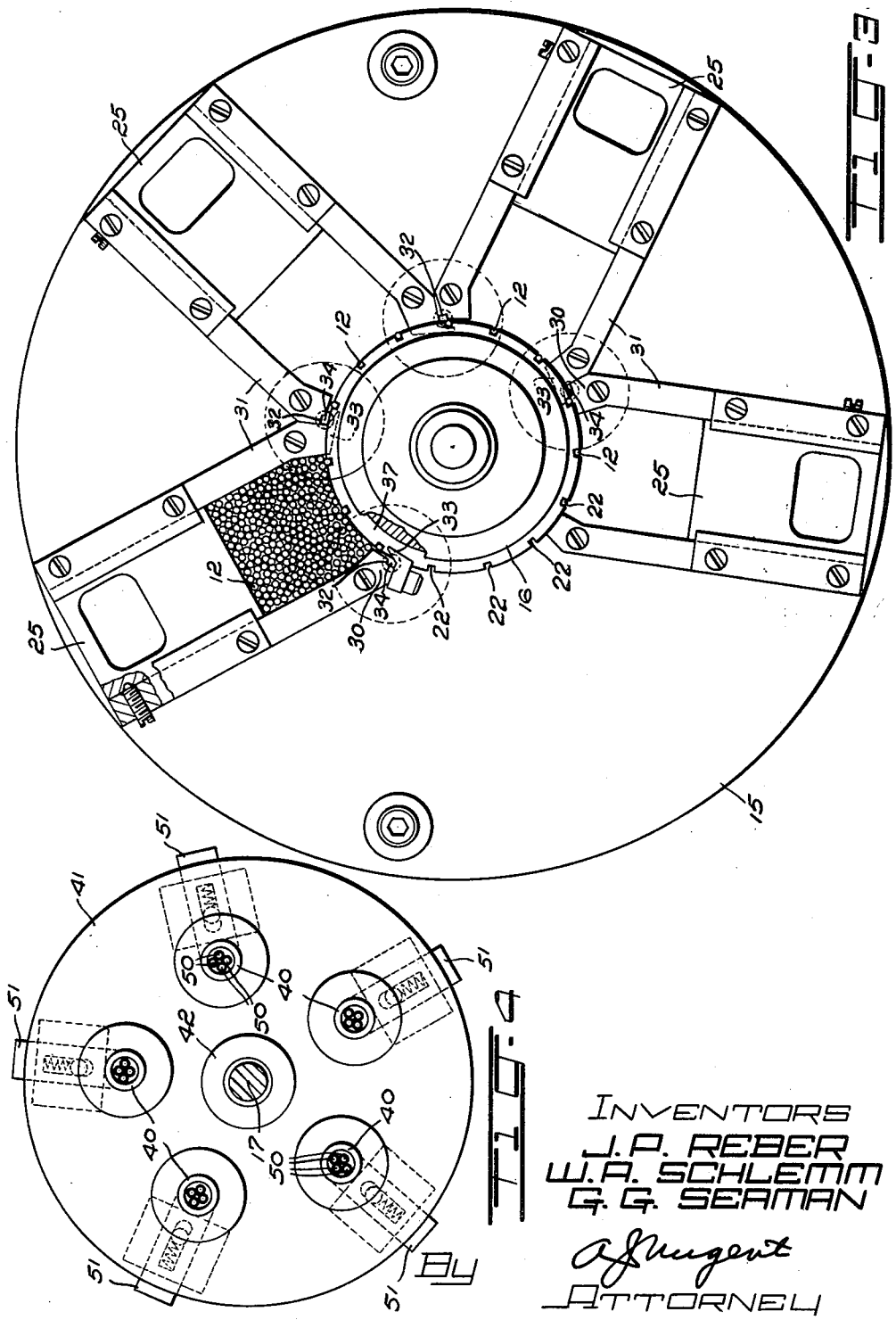

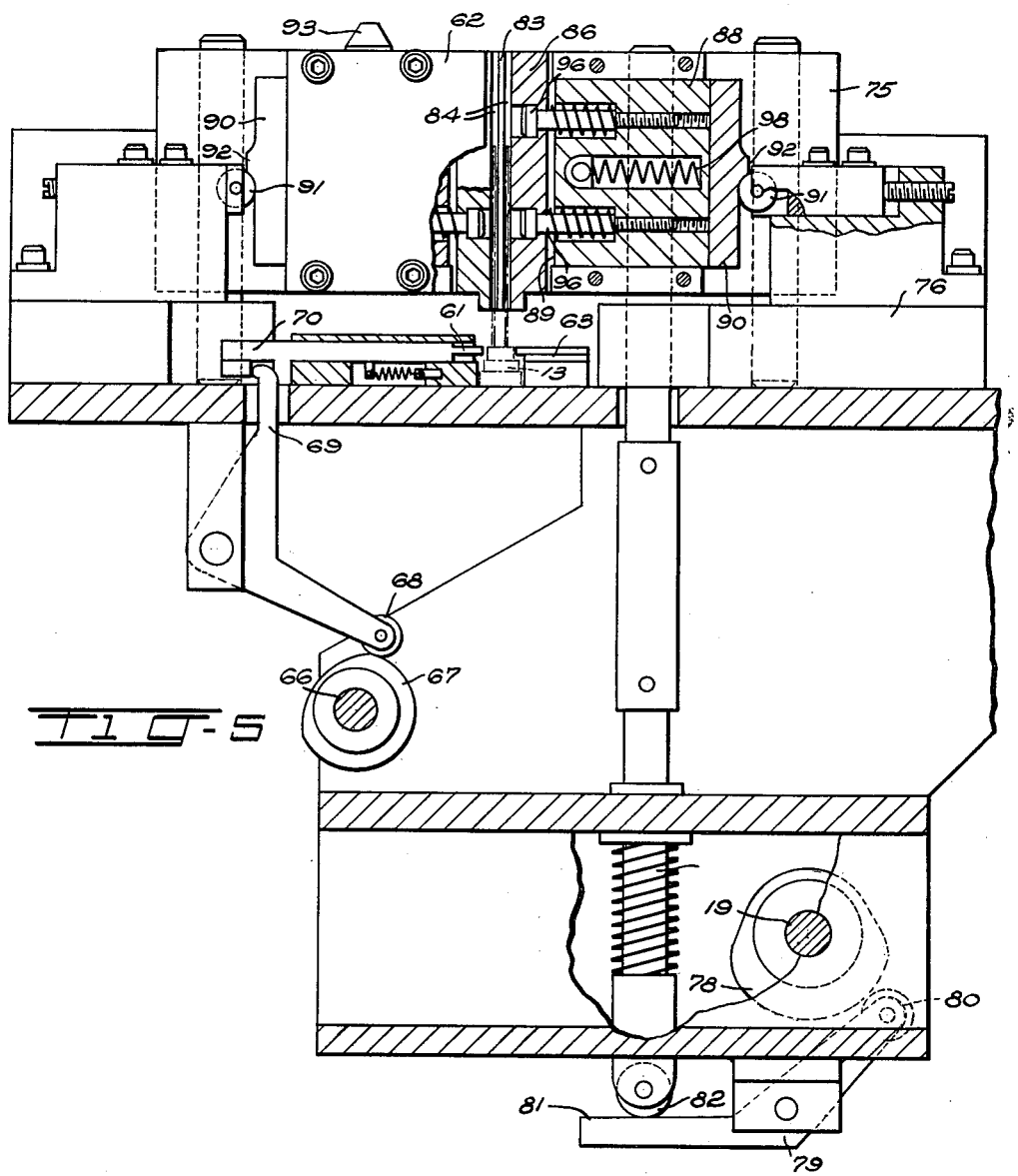

3,127,669
ARTICLE FEEDING APPARATUS

John P. Reber, West Lawn, and William A. Schlemm, Reading, Pa., and Gary G. Seaman, Millard, Nebr., assignors to Western Electric Company Incorporated, New York, N.Y., a corporation of New York
Filed Mar. 14, 1961, Ser. No. 95,666
11 Claims. (Cl. 29—203)

This invention relates to article feeding apparatus and particularly to an apparatus for feeding members into openings of an article.

In the fabrication of certain articles having elongated components, such as, headers used in semiconductive devices, one of the first operations required is the insertion of lead wires into the header mold openings. Typically, this may involve locating wires less than ten thousandths of an inch in diameter in mold openings only one thousandth larger than the wires. Manually, this operation is tedious and costly, and for large-scale production automatic assembly becomes necessary and profitable.

The object of this invention is an apparatus for automatically feeding members into article openings.

An important feature of this invention is a mechanism for guiding and positively seating the lead wires into the header mold openings regardless of any slight variation in the diameter of the leads or any misalignment of the leads with respect to the mold openings.

In accordance with the general features of the invention, the apparatus for feeding elongated members into openings of an article includes a unit for feeding the members individually to a receiving means. A plurality of accumulators is successively moved to the receiving means, each accumulator having a plurality of openings oriented with respect to the receiving means for receiving individual members therein. After an accumulator picks up the desired number of members, the members are released simultaneously into their respective article openings.

In a preferred embodiment a rotatable cylinder has a plurality of peripheral grooves for picking up individual lead wires from a supply and subsequently discharging the leads in separate funnels. Accumulators, each having a plurality of passageways therein, are successively indexed to the funnels to receive the leads. A guiding mechanism on a movable frame has a fixed plate separating a pair of opposing jaws movable transversely to the frame, the plate and each jaw defining channels for the passage of the leads. After an accumulator is loaded and made ready to release the leads simultaneously through the channels into the mold openings, the frame moves in one direction causing the jaws to advance and partially close thereby reducing the size of the channels to guide the leads into their respective mold openings. The jaws are adapted to be further advanced to grip and positively seat any misaligned leads in the mold openings.

Other objects will be apparent and a fuller understanding of the invention may be had by referring to the following description and claims, taken in conjunction with the accompanying drawing, in which:

FIG. 2 is a partial sectional-plan view of the apparatus in accordance with the invention;

FIG. 3 is a view taken along the lines 3—3 of FIG. 2;

FIG. 4 is a view taken along the lines 4—4 of FIG. 2;

FIG. 5 is a partial sectional view of the lead wire guiding mechanism.

Figure 1:
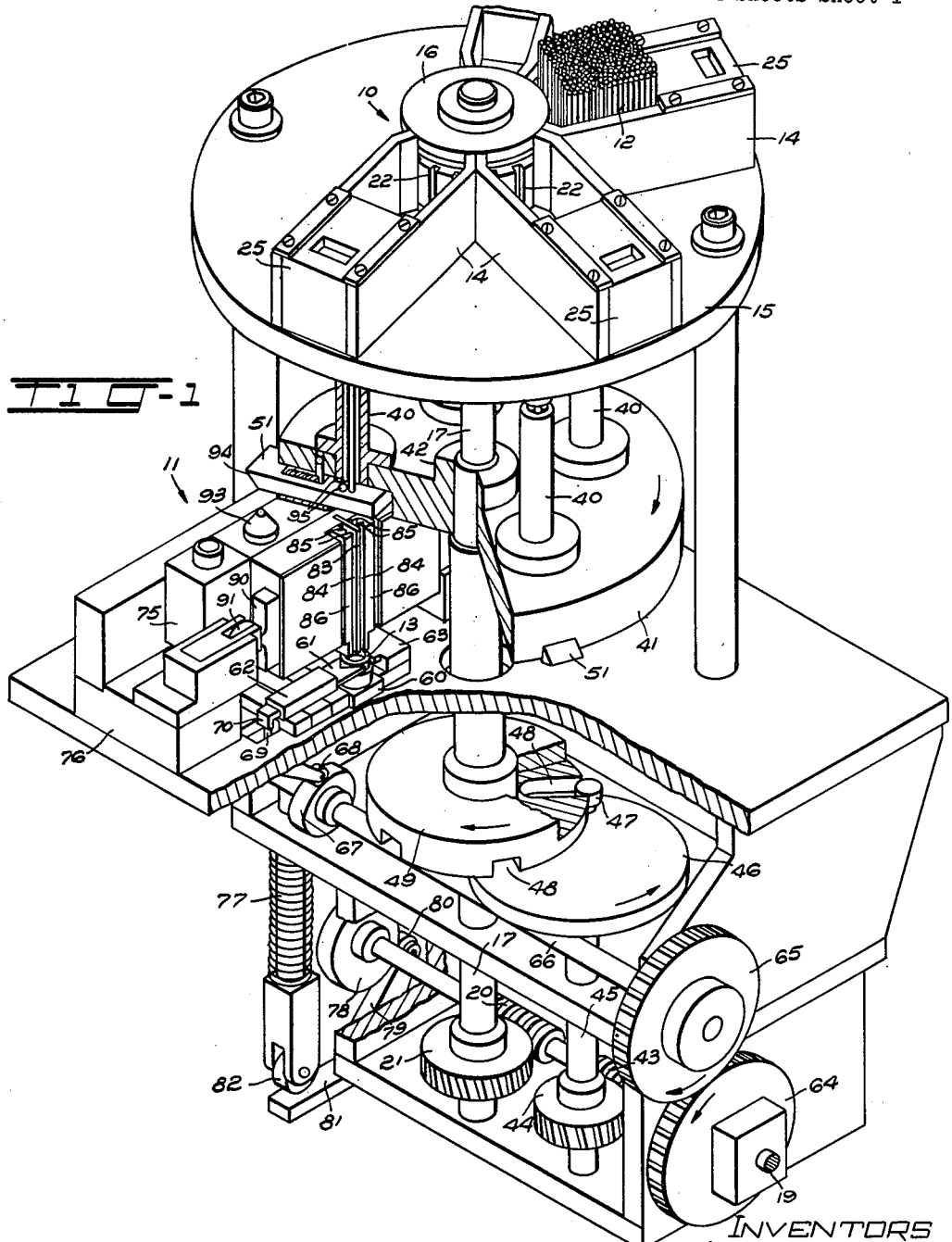
FIG. 1 is an isometric view of the apparatus in accordance with the invention.

With regard to the drawing, the invention is incorporated in a machine having a feeding and guiding mechanism, generally referred to at 10 and 11 respectively, for feeding and guiding four lead wires 12 (hereinafter referred to as leads) simultaneously to a header mold 13.

Four lead supply containers 14 are radially mounted on a support plate 15 about the periphery of a cylindrical feeding unit 16. The feeding unit 16 is connected to an inner shaft 17 and is rotatably driven by a motor 18 (FIG. 2) through drive shaft 19 having a worm 20 thereon in mesh with gear 21 connected to the inner shaft. The feeding unit 16 has a plurality of longitudinal grooves 22 spaced equidistant on its periphery for receiving individual leads from the containers. As seen in FIGS. 1 and 2, a pusher 25 normally urges the leads towards the feeding unit 16 via a suspended weighted member 26 having a strand 27 connected to the rear portion 28 of the pusher and riding over pulley 29.

As seen in FIG. 3, the front end surface 30, of the right side wall 31 of each container, is indented at 32 from the periphery of the feeding unit. An angular cam 33 is connected at one end to a side of the indented surface 32 and extends through the path of the advancing grooves 22 into a cylindrical recess 37 transversely cutting the longitudinal grooves. The angular extension of cam 33 extends past the indented surface 32 to form an exit opening 34 for the leads. Thus, during the rotation of the feeding unit 16, each groove picks off a lead from the supply and as it approaches cam 33, the lead engages the cam and slides from the groove into the opening 34. As seen in FIG. 2, a funnel 35 is connected to the bottom surface of the support plate 15 and has a longitudinal opening 36 communicating with opening 34 for receiving the lead. Each lead is passed to an accumulator 40, now to be described.

Five cylindrical lead accumulators 40 are vertically supported on an intermittent rotatable base 41. The base is secured to an outer shaft 42 driven by a worm 43 located on the main drive shaft 19 and in mesh with a gear 44 connected near one end of shaft 45. A circular member 46 is connected at the other end of shaft 45 and has a peg-like member 47 mounted on its top surface which successively engages one of a plurality of grooved portions 48 located in a disc 49 connected to the outer shaft 42, the grooved portions being spaced equidistant and extending radially inwardly towards the central axis of the disc. Upon each complete revolution of circular member 46, peg 47 enters and exits a grooved portion 48 thereby partially rotating disc 49 to intermittently drive the base 41 through outer shaft 42. This indexes the accumulators to successive predetermined positions with respect to the funnels 35, the intermittent drive of the base 41 being synchronous with the drive of the feeding unit 16.

Each accumulator 40 has four passageways 50 extending therethrough for receiving the leads from the funnels 35. The accumulators are mounted on the rotatable base 41 in such a manner that each time the base is rotated to advance an accumulator under a successive funnel 35, a different accumulator passageway 50 of each accumulator is oriented with respect to each funnel opening 34 to receive a lead therefrom. Thus, when base 41 has been advanced four times, one accumulator has received four successive leads from the funnels. The fully loaded accumulator is now ready to discharge the leads into the guiding mechanism 11 upon the next advance of the rotatable base 41, the next advance completing one cycle or revolution of the base.

As seen in FIGS. 1 and 2, a trap door 51 is located at the bottom end of each accumulator 40 to prevent the leads from falling through the passageways as they are being loaded. One end of a spring 52 is connected to the trap at 53 and the other end is connected to a vertically secured pin 54 extending through the base to maintain the trap in a normally closed position.

During the advance of a fully loaded accumulator to the guiding mechanism 11, the header mold jig 60 is indexed by conventional means (not shown) to advance a header mold 13 having four chamfered holes 87 therein to a lead feed receiving position. A spring loaded V-shaped locating member 61, movable in housing 62, is actuated to engage the mold 13 on one side and lock it against a stationary locating block 63 on the other side. The member 61 is driven from main drive gear 64 through gear 65, shaft 66, cam 67, cam follower 68 and element 69 engaging the rear portion 70 of the V-shaped member 61.

As seen in FIG. 1, 2 and 5, a floating frame 75, normally dwelling in a stationary frame 76, is vertically movable by a cam push rod 77. The push rod 77 is reciprocatably driven by a ram 78 on the main drive shaft 19 through a pivotal member 79 having a cam follower 80 on one end and a cam 81 on the other end for engagement by cam follower 82 connected to the bottom end of push rod 77. The floating frame 75 includes a fixed vertical plate 83 located between two opposing horizontally movable jaws 86, each jaw having a pair of grooved surfaces 85 extending the full length thereof and forming four channels 84 with plate 83 for the passage of the leads. When a fully loaded accumulator is advanced to the unload position, it is oriented over the floating frame 75 such that the accumulator passageways 50, channels 84, and header openings 87 have a common central axis.

As seen in FIG. 5, a movable block 88 is provided on the floating frame 75 for each jaw 86, the block having a jaw engaging surface 89 on one side and a cam 90 on the other side. In view of each block having a similar structure and function, it will suffice to describe only one block with particularity. Upon the upward movement of the floating frame 75, a cam follower 91 on the stationary frame 76 engages the high point 92 of cam 90 whereupon block 88 is moved horizontally, a spring 98 being located in the block for providing the necessary tension to hold the cam against the cam follower. The engaging surface 89 of the block contacts and moves the jaws towards the fixed vertical plate 83 causing the jaws to close and then partially reopen, the jaws being connected to the block by spring-loaded plungers 96. At this time, a cam 93, having an inclined surface and projecting from the top portion of floating frame 75, engages the end portion 94 of trap door 51 to move it forward until four provided holes 95 therein are in registration with the accumulator passageways 50. The leads then drop from the accumulator passageways 50 into the partially closed jaw channels 84 whereupon they are guided into the header mold holes 87.

During the descent of floating frame 75, the trap door 51 returns to its normal blocking position, and cam follower 91 by again engaging cam high point 92, further advances the jaws towards the plate 83. The jaws apply sufficient pressure on the leads to align and seat those leads that may have missed the mold openings without bending the leads that have seated themselves. In the event there is any variation in the diameter of the leads, the jaws will still engage and seat those leads as the jaws are adapted to rock sideways under the action of the spring-loaded plungers 96. As the floating frame continues its descent and the jaws are opened, the loaded header mold is free to be removed from the lead feed receiving position due to the open channels 84 between the jaws 86 and fixed vertical plate 83. Jig 60 is indexed to advance a succeeding unloaded mold which pushes and takes the place of the loaded mold at the lead feed receiving position. During this time, base 41 rotates to advance the accumulators to their succeeding funnel and the loaded accumulator to the unload position. When floating frame 75 reaches its lowest position on the stationary frame 76, a cycle is completed.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for feeding members into individual openings of an article, which comprises supply means for the members, a movable feeding unit cooperatively associated with the supply means for receiving the members individually therefrom, means communicating with the feeding unit at predetermined areas for individually receiving each member from the feeding unit, a plurality of movable accumulators each having a plurality of passageways oriented with respect to the receiving means for receiving individual members therefrom to load the accumulator, means cooperatively associated with the accumulators for releasing the members of a loaded accumulator simultaneously into their respective article openings, and means for supporting said supply means, feeding unit, receiving means, accumulators and releasing means in cooperative relationship with each other.

2. Apparatus for feeding and guiding elongated members into individual openings of an article, which comprises supply means for the members, a rotatable feeding unit having a plurality of grooves therein for receiving the members individually from the supply means, means communicating with the feeding unit at predetermined areas for individually receiving each member from the feeding unit grooves, a plurality of movable accumulators each having a plurality of passageways oriented with respect to the receiving means for receiving each member successively from the receiving means to load the accumulator, means cooperatively associated with the accumulators near their exit end portions for releasing the members of a loaded accumulator simultaneously, means for guiding the members from the releasing means to their respective openings in the article, and means for supporting said supply means, feeding unit, receiving means, accumulators, releasing means and guiding means in cooperative relationship with each other.

3. Apparatus according to claim 2 in which the guiding means comprises a vertical plate, a pair of horizontally movable opposing jaws separated by the plate and defining a channel therebetween when the jaws are in a retracted open position for permitting passage of the members therethrough, and means for closing the jaws to engage and seat the members passing through the channels into their respective article openings.

4. In apparatus for feeding elongated members into openings of an article, a mechanism for guiding the members into the openings, which comprises a frame movable in one direction, a pair of opposing jaws, movable transversely to the movable frame, a plate connected to the frame and disposed between the jaws to define channels therebetween, and means responsive to the movement of the frame for advancing the jaws towards the plate to engage and seat the members passing through the channels into their respective article openings.

5. A guiding mechanism according to claim 4 in which the jaw advancing means comprises a body for each jaw having a jaw engaging surface on one side and a cam on the other side, at least one spring-loaded element connecting the jaw to the body, and a cam follower engaging the cam for moving the body responsive to the movement of the frame so that the jaw engaging surfaces strike and move the jaws toward the plate.

6. In apparatus for feeding a plurality of lead wires into their respective openings of a header mold, a mechanism for guiding the members into the openings, which comprises a movable frame, means for reciprocatably moving the frame in one direction, a pair of opposing jaws movable transversely to the moving frame, a plate connected to the frame and disposed between the jaws to define channels therebetween for passage of the leads therethrough, and means responsive to the movement of the frame for advancing the jaws to reduce the size of the channels for guiding the leads passing therethrough into their respective mold openings.

7. In apparatus for feeding a plurality of lead wires into their respective openings of a header mold, a mechanism for guiding the members into the openings, which comprises a movable frame, means for reciprocably moving the frame in one direction, a pair of opposing jaws movable transversely to the moving frame, a plate connected to the frame and disposed between the jaws to define channels therebetween for passage of the leads therethrough, and means responsive to the movement of the frame for advancing the jaws to grip the leads and seat any misaligned leads into their respective mold openings.

8. In apparatus for feeding a plurality of lead wires into openings of a header mold, a mechanism for guiding and seating the leads into the openings, which comprises a floating frame, means for moving the frame in a reciprocating vertical direction, a pair of opposing jaws movable in a horizontal direction, a plate connected to the frame and disposed between the pairs to define channels therebetween for passage of the leads therethrough, and means responsive to the vertical movement of the floating frame for partially advancing the jaws to reduce the size of the channels for guiding the leads therethrough into their respective hold openings, the means being adapted to further advance the jaws to grip the leads and seat any misaligned leads into their respective mold openings.

9. A guiding and seating mechanism according to claim 8 in which the jaw advancing means comprises a body for each jaw having a jaw engaging surface on one side and a cam on the other side, at least one spring-loaded element connecting the jaw to the body, a fixed frame adjacent the floating frame, and a cam follower on the fixed frame engaging the cam for moving the body horizontally as the frame is moved vertically so that the jaw engaging surfaces strike and advance the jaws toward the plate.

10. A guiding and seating mechanism according to claim 9 in which the cam contour has a pair of elongated straight line surfaces approaching each other and parallel to the vertical plate for maintaining the jaws in a retracted position, the approaching surfaces curving outwardly from the vertical plate for partially advancing the jaws towards the plate to guide the leads therebetween, and a short straight line surface connecting the outwardly curved surfaces and being parallel to the vertical plate for further advancing the jaws to grip and seat any misaligned leads into the header mold openings.

11. Apparatus for feeding and guiding a plurality of wire leads into their respective openings of a header mold, which comprises a rotatable cylinder having a plurality of longitudinal grooves spaced equidistant about its periphery, a fixed support, a plurality of lead supply containers radially mounted on the support about the cylinder, means for driving the cylinder to load individual leads in the cylinder grooves, stripping means adjacent each container and extending into the paths of the loaded grooves for removing the leads, a funnel-like member for each container connected beneath the support and having an opening extending therethrough for receiving the removed leads, an intermittently rotatable base plate, a plurality of tube-like lead accumulators supported on the base plate, each accumulator having a number of passageways equal to the number of funnel-like members, the passageways in each accumulator being oriented with respect to the funnel openings for receiving individual leads successively from each funnel upon the intermittent rotational movement of the base plate, locking means near the exit end of the accumulator for blocking the leads as they are received in the accumulator, a vertically reciprocating frame having a fixed plate thereon, a pair of horizontally movable opposing jaws on the frame and separated by the fixed plate, means for activating the frame, first cam means on the frame responsive to the movement of the frame for releasing the locking means to permit the leads to pass from the accumulator through the jaws into the mold openings, and second cam means for each jaw responsive to the continued movement of the frame for advancing the jaws towards the plate to guide the leads, the second cam means being adapted to further advance the jaws to grip and positively seat any misaligned leads in the mold openings.

References Cited in the file of this patent

UNITED STATES PATENTS

| | | |
|---|---|---|
| 2,222,605 | Carlson | Nov. 26, 1940 |
| 2,692,424 | Habel | Oct. 26, 1954 |
| 2,841,937 | Miskel | July 8, 1958 |
| 2,844,865 | Cook | July 29, 1958 |
| 2,896,208 | Alderman | July 28, 1959 |